Oct. 17, 1967  V. R. DUNN  3,347,276
PIPE JACKET CONSTRUCTION
Original Filed Nov. 29, 1963
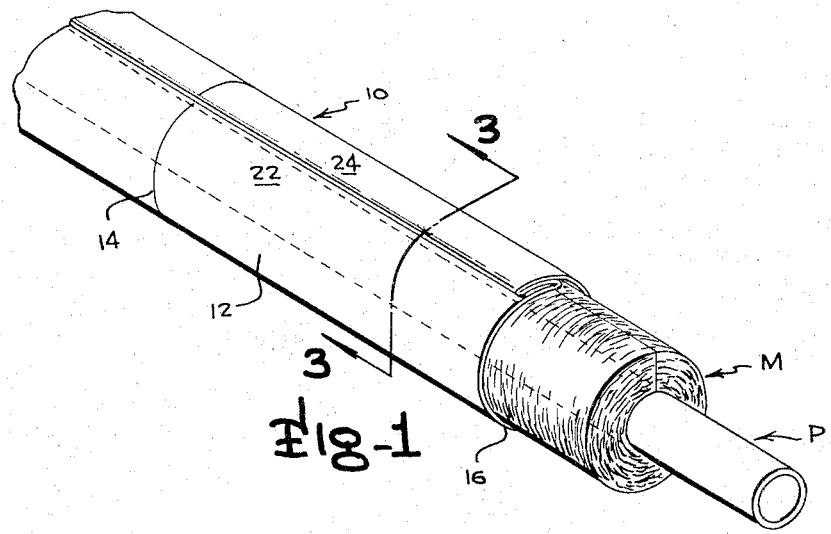
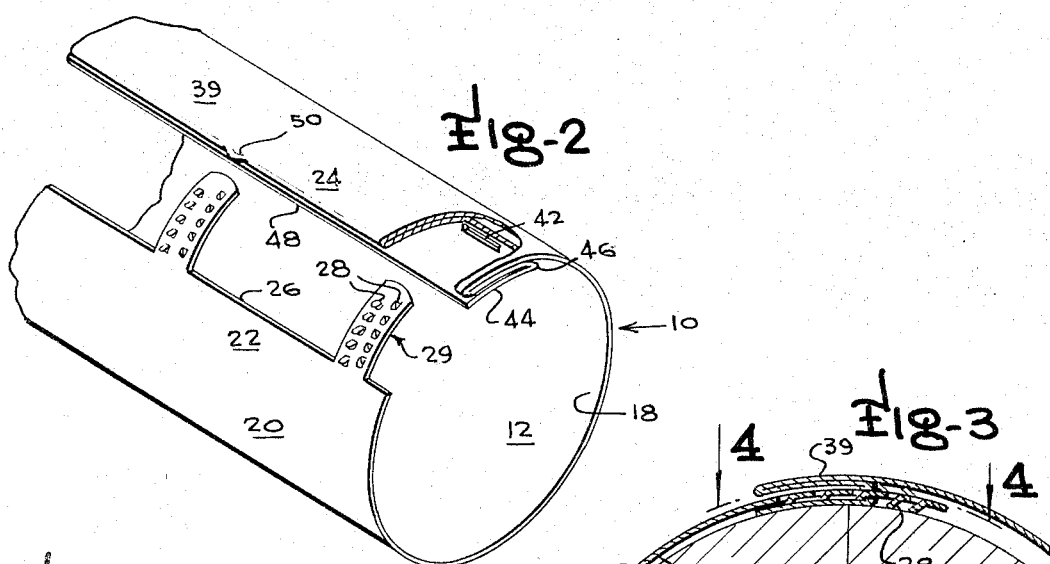
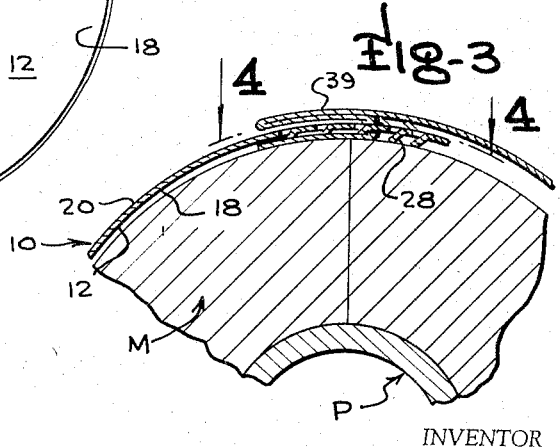
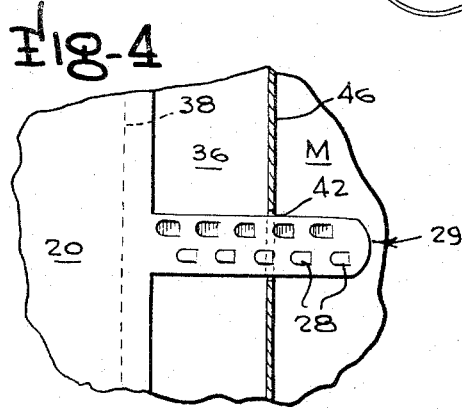
INVENTOR
VICTOR R. DUNN
BY Robert G. McMorrow
ATTORNEY

# United States Patent Office 3,347,276
Patented Oct. 17, 1967

3,347,276
PIPE JACKET CONSTRUCTION
Victor R. Dunn, P.O. Box 1134,
Shreveport, La. 71101
Original application Nov. 29, 1963, Ser. No. 329,340, now Patent No. 3,242,948. Divided and this application Dec. 22, 1965, Ser. No. 515,615
1 Claim. (Cl. 138—166)

ABSTRACT OF THE DISCLOSURE

A pipe jacket construction for covering insulation about a pipe, the jacket having adjustable, interfitting locking means including tongues with tabs thereon extended to corresponding slots.

This invention relates to pipe jackets, and more specifically, to an improved pipe jacket construction provided with means for rapid installation with a minimum of handling and manipulation. This application is a division from my copending application Ser. No. 329,340, filed Nov. 29, 1963, now Patent No. 3,242,948.

It has been previously known to supply sections of metallic jacketing for use in covering insulated pipe, but the construction of such previously known jacket sections, particularly as related to the mounting means therefor, has resulted in jacketing which is difficult to install and often impossible to dismantle without destruction thereof, and has resulted in jacketing requiring more than one person to mount and demount. A primary object of the present invention is therefore to provide a pipe jacket construction adapted for installation or removal by one mechanic without assistance, and which is securely positioned when in place.

An ancillary object is to provide a pipe jacket construction involving plural connection means, and having indicia means thereon for alignment of the connection means.

Another object of importance resides in the provision of connection means employing the inherent resiliency of the jacket material in initial connection and in maintaining the connection.

General objectives include the provision of a jacket construction of the character identified above which is non-complex in construction and assembly, inexpensive to manufacture and sell, easily transported, and durable in use.

Other and further objects and advantages of the present invention will become apparent from a consideration of the following specification when read in conjunction with the annexed drawing, in which:

FIGURE 1 is a perspective view of insulated pipe having a jacket constructed and assembled in accordance with the teachings of this invention in place thereon, the insulation and jacket being partially removed for illustration;

FIGURE 2 is a perspective view, on enlarged scale, broken away for disclosure of details, showing a jacket hereof;

FIGURE 3 is an enlarged sectional view taken substantially on the section line 3—3 of FIGURE 1, showing details; and FIGURE 4 is a view of the connection means hereof taken on the line 4—4 of FIGURE 3, looking in the direction of the arrows.

This invention finds its environment of use in association with pipe used, for example, to conduct fluid substances, a pipe of this type being indicated at P in FIGURES 1 and 3. In some instances, as for example, where the fluid is to be maintained at a given temperature or where condensation on the pipe P is to be avoided, the pipe P is covered with one or more layers of insulation material M often of a relatively soft, fibrous material of sufficient porosity to effectively limit the transfer of heat therethrough. To protect the insulation material M, to further insulate the pipe P, and for other purposes known in the art, it is desirable to provide a sheath or pipe jacket to encase the pipe P and the insulation M.

The pipe jacket of this invention is generally identified in the drawing by reference numeral 10, and is supplied in consecutive sections as shown in FIGURE 1. The jacket 10 includes a main body sheet 12 for each section with ends 14 and 16, and further includes inner and outer surfaces 18 and 20, respectively. The sheet 12 is rolled to the substantially circular form of FIGURE 2, in which condition it has a first side portion 22 and an adjacent second side portion 24.

The first side portion 22 terminates in a side edge 26. At spaced locations along the edge 26 there are provided a plurality of group elements or tongues 29, each having a plurality of struck tabs 28 thereon, the tabs 28 being arranged in staggered rows, and the tabs of each row being struck in opposite directions to provide both inward and outward tabs on each tongue or group element.

The second side portion 24 has a reverted section 36 bent inwardly along a fold line 38, and terminating in a semicircular fold 46 or end wall to which is joined an interior rebent portion 44 terminating in an end edge 48. An outer, imperforate wall 39 overlies the side portion 24 to conceal and protect the connection and to make the completed assembly imperforate. At locations spaced along the semicircular fold or wall 46, there is formed a plurality of slots 42 of a width to permit passage of the tongues 29 and their tabs therethrough. As best seen in FIGURE 3, the tabs 28 extend outwardly a distance such that upon the application of force the tongue is extended through the slot but the tab depth is such that the tabs engage the inner side of the wall 46 after placement therethrough, thus preventing withdrawal or removal of the tongue after insertion through the slot 46 to desired depth without careful and complex manipulation.

Indicia means 50 is provided along the edge 30 of the side portion 24 to facilitate alignment of the edges for positioning of the tongues within the slots.

In use, the installation of the invention involves the alignment of the tongues 29 with the indicia 50, followed by a manual thrust of the portions 22 between the sections 36 and 44. This results in entry of the tongues 29 into the slots 42, and a slight retrogressive movement of either portion causes the tabs 28 to engage the slot—the inherent resiliency of the sheet 12 and tendency thereof to resume the unconnected form serving to aid in maintaining the locked relation between the sections.

Having described and illustrated a form of this invention in some detail, it is to be understood that this description and illustration is offered merely by way of an example, and that the invention is to be limited in scope only by the appended claim.

What is claimed is:

In a pipe jacket for use in encasing a pipe and fibrous insulation about the pipe, the jacket being of adjustable diameter:

a cover member of rolled sheet form having interfitting first and second side portions;

the first side portion having a plurality of tongues projecting outwardly therefrom at spaced locations;

a plurality of tabs struck outwardly from each of the tongues, the tabs being arranged in groups, and each group having its tabs disposed in rows, the tabs of adjacent rows of each tongue being staggered;

the tabs extending outwardly from the tongues and including free outer end portions and being outwardly inclined from the tongues in the direction of the first side portion;

the tabs of adjacent rows being struck outwardly on opposite sides of the tongues;

the second side portion of the cover member having an imperforate top section, a reverted section underlying the top section, and a rebent section underlying the top and connected to the reverted section by an interior wall;

the interior wall having slots formed therein at spaced locations corresponding to the locations of the tongues on the first side portion;

indicia means on the second side portion aligned with the slots in the interior wall for prelocation of the tongues in alignment with the slots thereof; and the tongues being engaged in the slots with one tab of each group engaging the interior wall, the depth of insertion of the tongues being such that the cover member is tightly engaged about the insulation.

References Cited

UNITED STATES PATENTS

| | | | |
|---|---|---|---|
| 1,534,990 | 4/1925 | Pritchard | 138—166 |
| 3,154,330 | 10/1964 | Clark et al. | 24—20 X |

FOREIGN PATENTS

| | | |
|---|---|---|
| 888,238 | 1/1962 | Great Britain. |

LAVERNE D. GEIGER, *Primary Examiner.*

B. KILE, *Assistant Examiner.*